Patented Sept. 5, 1950

2,520,901

UNITED STATES PATENT OFFICE 2,520,901

PROCESS FOR PREPARING A HYDROABIETYLAMINE

George J. Benoit, Jr., San Anselmo, Calif., assignor to Hercules Powder Company, Wilmington, Del., a corporation of Delaware No Drawing. Application December 18, 1945,
Serial No. 635,770

4 Claims. (Cl. 260—100)

This invention relates to new rosin amines and the method of producing these compounds, and more particularly to hydroabietylamines.

In accordance with this invention it has been found that a new class of amines, the hydroabietylamines, may be prepared by subjecting hydroabietaldehyde to the action of ammonia and hydrogen in the presence of an active hydrogenation catalyst. The hydroabietylamines formed by this process are stable amines due to the hydrogenation of the abietyl radical.

The following examples are illustrative of the process for preparing the new amines in accordance with this invention. All parts and percentages are by weight unless otherwise indicated.

Example I

One hundred sixteen parts of a crude hydroabietaldehyde (containing about 54% aldehyde) were mixed with 250 parts of absolute alcohol and 76 parts of anhydrous ammonia. After the addition of 25 parts of Raney nickel the mixture was subjected to hydrogenation at 130° C. for 6 hours under 1600 pounds per square inch of hydrogen. The solution was filtered to remove the catalyst and the solvent removed by distillation, first on a steam bath, and then in vacuo at 150° C. The crude product had a neutral equivalent of 727 and a nitrogen content of 2.19%. It contained about 40% hydroabietylamine which corresponded to a conversion of aldehyde to amine of about 67%.

Example II

Two hundred eighty-seven parts of a crude hydroabietaldehyde (containing about 64% aldehyde) were mixed with 400 parts of absolute ethanol, 203 parts of anhydrous ammonia and 50 parts of Raney nickel. The mixture was hydrogenated at 130° C. for 6 hours at 1510 to 1725 pounds per square inch of hydrogen. The catalyst was removed by filtration from the mixture and a red viscous resin separated from the alcoholic solution. This resinous fraction was freed from solvent by heating at 150° C. in vacuo. It was found to have a neutral equivalent of 1959 and thus contained about 15% hydroabietylamine. The solvent was removed from the alcohol-soluble fraction by distilling up to the temperature of 150° C. in vacuo. This fraction had a neutral equivalent of 605, which corresponds to a hydroabietylamine content of about 48%.

The crude amine was purified by dissolving a portion of it in hexane and then extracting the hexane solution with a solution of 118 parts of concentrated hydrochloric acid in 300 parts of water and 470 parts of ethanol. The acid layer was separated and the amine recovered by adding sodium hydroxide until the solution was alkaline, and then extracting the alkaline solution with hexane. The hexane was removed by distillation and the hydroabietylamine recovered had a neutral equivalent of 366. A second portion of the crude amine was purified in an analogous manner to give a hydroabietylamine having a neutral equivalent of 341. To effect further purification a mixture of 24 parts of the first fraction and 12 parts of the second fraction was dissolved in a solution of 64 parts of concentrated hydrochloric acid in 150 parts of water and 236 parts of alcohol. The solution was washed 5 times with hexane. Sodium hydroxide, 40 parts, was then added to the acidic solution and the amine was recovered by extraction with 5 portions of hexane. The hexane solution was washed with water until the aqueous layer was neutral. It was then decolorized by treatment with activated charcoal and the hexane removed by distilling up to 150° C. in vacuo. The hydroabietylamine obtained was a viscous yellow oil which had the following analysis:

| | Found | Calculated for Hydroabietylamine | |
|---|---|---|---|
| | | Tetra-, $C_{20}H_{37}N$ | Di-, $C_{20}H_{35}N$ |
| Neutral Equivalent | 302.00 | 291.5 | 289.5 |
| Per Cent Nitrogen (Kjeldahl) | 4.80 | 4.80 | 4.83 |
| Bromine Number | 30.00 | | |

Example III

Fifty parts of the crude hydroabietylamine prepared in Example II were dissolved in 285 parts of ether and 5.2 parts of glacial acetic acid were added. By allowing the solution to stand at 0° C. to 3° C. crystals of hydroabietylamine acetate separated. The colorless crystalline product was filtered and washed with ether. The hydroabietylamine acetate so obtained had a melting point of 129.5° C. to 132.5° C. On recrystallization from alcohol-ether and then from benzene-hexane two crystalline hydroabietylamine acetates were obtained, one having a melting point of 165° C.–166.5° C. and the other a melting point of 137.° C.–139° C. The product melting at 165° C.–166.5° C. had the following analysis:

| | Found | Calculated for Hydroabietylamine Acetate | |
|---|---|---|---|
| | | Tetra-, $C_{22}H_{41}O_2N$ | Di-, $C_{22}H_{39}O_2N$ |
| Per Cent Nitrogen (Dumas) | 4.01 | 3.99 | 4.01 |
| Per Cent Carbon | 55.62 | 75.16 | 75.59 |
| Per Cent Hydrogen | 11.89 | 11.75 | 11.24 |
| Bromine Number | 2 | | |

*Example IV*

One hundred sixteen parts of crude hydroabietaldehyde (containing about 62% aldehyde) were mixed with 250 parts of absolute ethanol, 76 parts of anhydrous ammonia and 25 parts of Raney nickel. The mixture was hydrogenated under 2500 pounds per square inch of hydrogen at 130° C. for 6 hours. The product was filtered to remove the catalyst and the solvent was removed by distilling up to a temperature of 150° C. in vacuo. The hydroabietylamine left as a residue had a neutral equivalent of 812 which corresponded to an amine content of about 36%. This represents a conversion of aldehyde to amine of about 57%.

The crude hydroabietylamine was dissolved in a solution of 118 parts of concentrated hydrochloric acid in a mixture of 425 parts of ethanol and 260 parts of water. This solution was then extracted with hexane in a continuous extractor for 2 hours in order to remove any unreacted constituents. The acidic aqueous solution was made alkaline by adding 100 parts of sodium hydroxide in 600 parts of water and the amine was recovered by extracting with hexane. The hexane solution was washed with water until neutral, decolorized with activated charcoal, and dried with anhydrous sodium sulfate. The hexane was then removed by distillation. The hydroabietylamine obtained had a neutral equivalent of 312. The yield of hydroabietylamine was increased by a second extraction, the product obtained from this extraction having a neutral equivalent of 300. (The neutral equivalent calculated for dihydroabietylamine is 289.5 and for tetrahydroabietylamine 291.5.)

The hydroabietaldehyde from which the hydroabietylamines are prepared in accordance with this invention may be prepared by the catalytic dehydrogenation of hydroabietyl alcohol. The dehydrogenation reaction may be carried out by any desired means. The reaction may be carried out in liquid phase using ethylene as a hydrogen acceptor and a catalyst such as copper chromite catalyst, Raney nickel, etc. Such a process is described and claimed in copending application, Serial Number 739,361, filed April 4, 1947, now U. S. Patent No. 2,492,614. Any other process for preparing hydroabietaldehyde may be used. The hydroabietyl alcohol undergoing this reaction may be a pure dihydroabietyl alcohol or tetrahydroabietyl alcohol or the crude mixture of these two, such as is found in commercial hydroabietyl alcohol.

The reductive amination of hydroabietaldehyde may be carried out in the presence of any active hydrogenation catalyst as, for example, an active base metal catalyst such as nickel, cobalt, Raney nickel, Raney cobalt, etc., or a noble metal catalyst such as active platinum, palladium, palladium on carbon, or reduced platinum oxide. The reaction is preferably carried out in the presence of an active base metal catalyst such as Raney nickel or Raney cobalt catalyst. The amount of catalyst used for the reaction may vary from about 1% to about 25% and is preferably from about 10% to about 20%.

The reductive amination reaction is usually carried out out the presence of a solvent. Any anhydrous polar solvent which is inert to ammonia and to hydrogenation under the conditions of the reaction may be used such as alcohols, ethers, aromatic hydrocarbons and saturated aliphatic hydrocarbons. The simple alcohols such as methanol, ethanol, propanol, etc., are particularly useful due to the high solubility of ammonia in these solvents. The amount of anhydrous ammonia used may vary over a wide range but usually is from about 50% to about 100% by weight of the amount of hydroabietaldehyde used. The reaction may be carried out at a temperature of about 100° C. to about 250° C. and preferably is carried out at about 125° C. to about 175° C. A hydrogen pressure of about 200 to about 8000 pounds per square inch may be used although from about 1500 to about 2500 pounds per square inch is preferable when using a Raney nickel or Raney cobalt catalyst.

The hydroabietylamine obtained may be purified by any desired means. While it may be purified by a simple distillation operation this is not always practical since a considerable amount of neutral material boils in the same range as the amine. The hydroabietylamine may be purified by extraction with a dilute solution of acid. Any inorganic acid such as hydrochloric acid may be used for the extraction. The extraction is usually carried out by dissolving the amine in a hydrocarbon solvent, such as hexane. The acid is then usually dissolved in a mixture of alcohol and water in order to carry out the extraction, the alcohol helping to prevent emulsification in the extraction procedure. An alternative method of purifying the hydroabietylamine is by the crystallization of the amine acetate or other salt. The amine acetate may be formed by mixing the crude hydroabietylamine with glacial acetic acid in ether solution, or some other convenient solvent, and cooling the solution to bring about crystallization. By fractional crystallization of the hydroabietylamine acetate so obtained, the di- and tetra-hydroabietylamine acetates may be separated. This process is illustrated in Example III in which a fraction having a melting point of 165° C. to 166.5° C. was obtained which is believed to be relatively pure tetrahydroabietylamine as indicated by the fact that it has a bromine number of 2 and, therefore, is nearly saturated. The free amine may readily be obtained from the acetate by dissolving the acetate in water, adding alkali to liberate the amine and extracting the amine from the aqueous solution with a hydrocarbon solvent such as hexane.

The hydroabietylamines produced in accordance with this invention are light-colored, viscous sticky liquids boiling between about 140° C. and 180° C. at 0.5 mm. of mercury. The amine prepared from a crude hydroabietaldehyde obtained from commercial hydroabietyl alcohol is a mixture of dihydroabietylamine and tetrahydroabietylamine since the commercial alcohol is a mixture of the di- and tetra-hydroabietyl alcohols. The proportion of the dihydro derivative to the tetrahydro derivative in the crude hydroabietylamine is dependent upon the degree of hydrogenation of the hydroabietyl alcohol used as the starting material. If either the pure dihydroabietylamine or tetrahydroabietylamine is desired they may be separated from the mixture by fractional extraction or by fractional crystallization of the acetates or other salts as described above. They may also be obtained by starting with the corresponding hydroabietaldehyde in carrying out the reaction of this invention.

The hydroabietylamines may also be prepared by the reduction of hydroabietonitriles. The nitrile may be obtained from hydrogenated rosin by heating the rosin in liquid phase with ammonia and removing the water from the reaction mixture as fast as it is formed. The hydroabietonitrile so obtained may then be reduced to form hydroabietylamine by subjecting the nitrile to hydrogenation in the presence of an active hydrogenation catalyst.

The hydroabietylamines and their salts are useful as flotation agents, emulsifying agents, insecticides, plasticizers and for rubber compounding. They are also useful as chemical intermediates for the preparation of quaternary ammonium salts useful as detergents, wetting agents, etc., and for the preparation of amides, sulfonamides, substituted ureas and many other compounds.

What I claim and desire to protect by Letters Patent is:

1. The process of preparing a hydroabietylamine which comprises contacting hydroabietaldehyde with anhydrous ammonia and hydrogen, at a pressure of about 200 to 8000 pounds per square inch, in the presence of an active hydrogenation catalyst at a temperature of about 100° C. to about 250° C.

2. The process of preparing a hydroabietylamine which comprises contacting hydroabietaldehyde with anhydrous ammonia and hydrogen, at a pressure of about 200 to 8000 pounds per square inch, in the presence of an active base metal hydrogenation catalyst, at a temperature of about 100° C. to about 250° C.

3. The process of preparing a hydroabietylamine which comprises contacting hydroabietaldehyde with anhydrous ammonia and hydrogen, at a pressure of about 200 to 8000 pounds per square inch, in the presence of Raney nickel at a temperature of about 100° C. to about 250° C.

4. The process of preparing a hydroabietylamine which comprises contacting hydroabietaldehyde with anhydrous ammonia and hydrogen, at a pressure of about 1500 to 2500 pounds per square inch, in the presence of Raney nickel at a temperature of about 125° C. to about 175° C.

GEORGE J. BENOIT, JR.

REFERENCES CITED

The following references are of record in the file of this patent:

UNITED STATES PATENTS

| Number | Name | Date |
|---|---|---|
| 2,155,036 | Byrkit | Apr. 18, 1939 |
| 2,165,515 | Schmidt | July 11, 1939 |
| 2,194,429 | Krzikalla et al. | Mar. 19, 1940 |
| 2,373,705 | Olin et al. | Apr. 17, 1945 |
| 2,412,708 | Blair | Dec. 11, 1946 |

OTHER REFERENCES

French (Dubourg), Bulletin De L'Institut Du Pin No. 59, Apr. 1929 (pp. 138–147).

Certificate of Correction

Patent No. 2,520,901 September 5, 1950

GEORGE J. BENOIT, Jr.

It is hereby certified that error appears in the printed specification of the above numbered patent requiring correction as follows:

Column 3, line 15, in the table, second column thereof, for "55.62" read *75.62*;

and that the said Letters Patent should be read as corrected above, so that the same may conform to the record of the case in the Patent Office.

Signed and sealed this 14th day of November, A. D. 1950.

[SEAL]

THOMAS F. MURPHY,
*Assistant Commissioner of Patents.*